United States Patent
Saegusa

(10) Patent No.: US 11,825,208 B2
(45) Date of Patent: Nov. 21, 2023

(54) IMAGE CAPTURING APPARATUS CAPABLE OF CONTINUOUS SHOOTING, LIGHTING DEVICE, AND METHODS OF CONTROLLING THEM

(71) Applicant: CANON KABUSHIKI KAISHA, Tokyo (JP)

(72) Inventor: Hiroki Saegusa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/747,615

(22) Filed: May 18, 2022

(65) Prior Publication Data
US 2022/0377226 A1 Nov. 24, 2022

(30) Foreign Application Priority Data
May 21, 2021 (JP) .................................. 2021-086106

(51) Int. Cl.
*H04N 23/74* (2023.01)
*H04N 23/71* (2023.01)

(52) U.S. Cl.
CPC ............ *H04N 23/74* (2023.01); *H04N 23/71* (2023.01)

(58) Field of Classification Search
CPC ........ H04N 23/74; H04N 23/71; H04N 23/73; H04N 23/663; G03B 7/17; G03B 15/05; Y02B 20/40
See application file for complete search history.

(56) References Cited

U.S. PATENT DOCUMENTS

| 6,362,221 B1* | 3/2002 | Clark | A61K 31/07 514/762 |
| 7,420,613 B2* | 9/2008 | Lee | H04N 23/74 348/370 |
| 2004/0135923 A1* | 7/2004 | Kato | H04N 23/74 348/E5.038 |
| 2020/0041873 A1* | 2/2020 | Oda | H04N 23/73 |

FOREIGN PATENT DOCUMENTS

JP H05-158116 A 6/1993

* cited by examiner

*Primary Examiner* — Luong T Nguyen
(74) *Attorney, Agent, or Firm* — Canon U.S.A., Inc. IP Division

(57) ABSTRACT

An image capturing apparatus communicates with a strobe device used for image capturing and acquires preliminary light emission result information performed by the strobe device. A light control process for determining a light amount of main emission by the strobe device for main image capturing is executed based on the acquired preliminary light emission result information. In a case where an image capturing frequency for repeating image capturing is higher than a threshold value, information which is different from information on the light amount of main emission and is used for settings of preliminary light emission or main light emission is communicated by dividing the information into information acquired by a first communication processing before preliminary light emission and information communicated by a second communication processing after preliminary light emission.

14 Claims, 7 Drawing Sheets

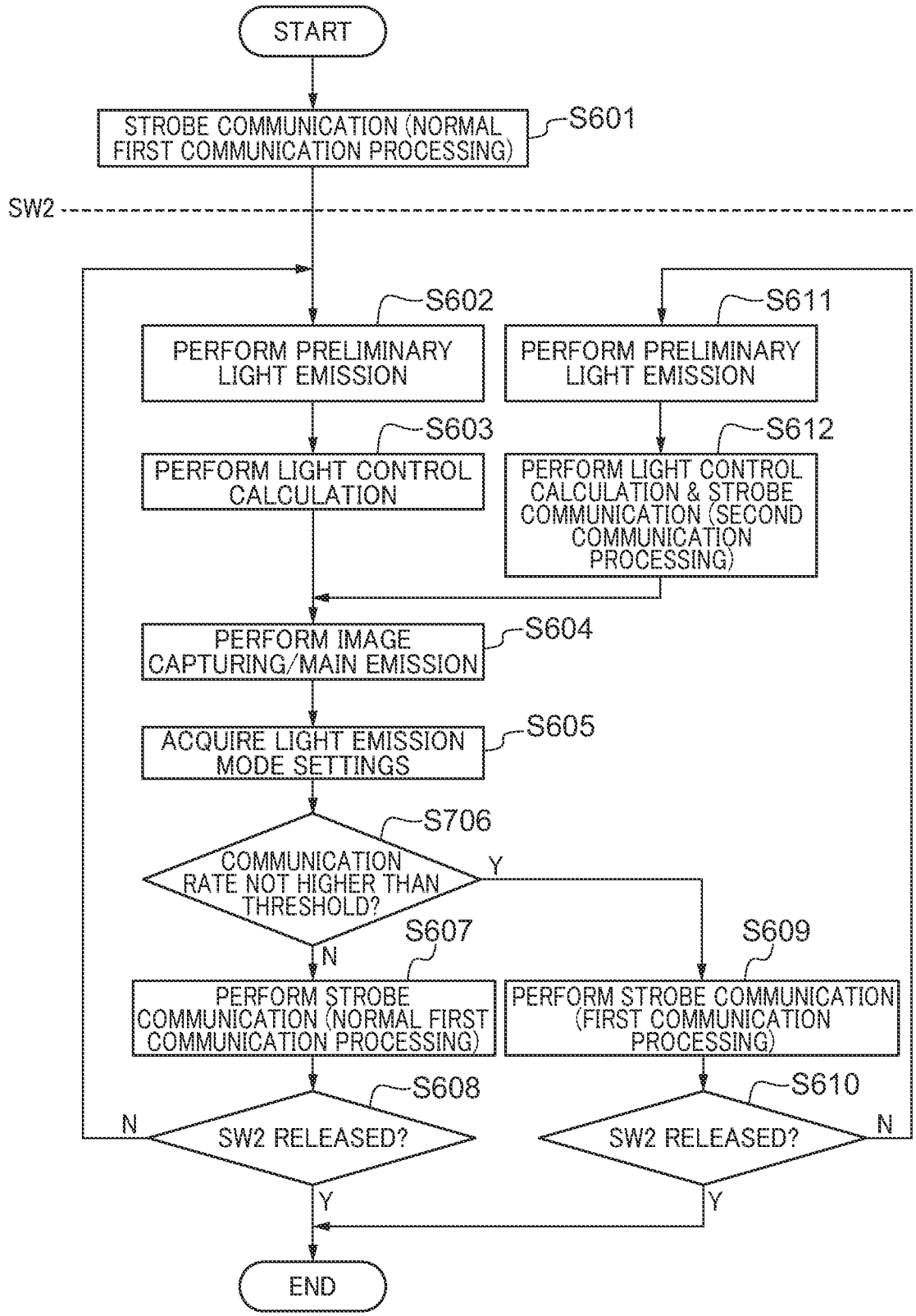

IMAGE CAPTURING APPARATUS CAPABLE OF CONTINUOUS SHOOTING, LIGHTING DEVICE, AND METHODS OF CONTROLLING THEM

BACKGROUND

Field of the Disclosure

The disclosure relates to an image capturing apparatus that is capable of continuous shooting, a lighting device, and methods of controlling them.

Description of the Related Art

An image capturing apparatuses is capable of attaching an external strobe device as a lighting device thereto and causing the strobe device to emit light when capturing an image, as disclosed in Japanese Laid-Open Patent Publication (Kokai) No. H05-158116. Further, in this case, the image capturing apparatus sometimes causes the strobe device to perform preliminary light emission before a main image capturing operation and executes a light control process for determining a light amount of main emission. To execute this light control process, the image capturing apparatus is required to cause the strobe device to perform preliminary light emission before main light emission for a main image capturing operation, communicate with the strobe device to receive information on a result of the preliminary light emission from the strobe device, and calculate a light amount of main emission based on the acquired information.

Incidentally, image capturing apparatuses include one equipped with a continuous shooting function of repeating the image capturing operation. When performing continuous shooting, the image capturing apparatus sometimes causes the strobe device to emit light whenever an image is captured. In this continuous shooting, the image capturing apparatus is also expected to cause the strobe device to perform preliminary light emission and execute the light control process for calculating a light amount of main emission. However, if the image capturing apparatus causes the strobe device to emit light and executes the light control process for calculating a light amount of main emission whenever an image is captured during continuous shooting, it takes a time until the process is terminated. The light control process for calculating a light amount of main emission, which is executed whenever an image is captured, limits the speed of continuous shooting, and hence the speed of continuous shooting cannot be made higher than the limited speed. As a countermeasure, similar to the technique disclosed in Japanese Laid-Open Patent Publication (Kokai) No. H05-158116, in which strobe zoom driving of a strobe device is fixed and inhibited during continuous shooting, it is envisaged to fix and inhibit the light control process for calculating a light amount of main emission during continuous shooting. However, in this case, it is impossible to cause the light amount of main emission to respond to a change in an image capturing environment during continuous shooting.

SUMMARY

In a first aspect of the embodiments, there is provided an image capturing apparatus including at least one processor, and a memory coupled to the at least one processor, the memory having instructions that, when executed by the processor, perform the operations as: an image capturing communication section configured to communicate with a lighting device, and a light control unit configured to execute a light control process for determining a light amount of main emission by the lighting device, by causing the lighting device to perform preliminary light emission, wherein in a case where an image capturing frequency for repeating image capturing is higher than a threshold value, the image capturing communication section communicates information which is different from information on the light amount of main emission and is used for settings of preliminary light emission or main light emission, by dividing the information into information communicated by a first communication processing before preliminary light emission and information communicated by a second communication processing after preliminary light emission.

In a second aspect of the embodiments, there is provided a lighting device used for image capturing performed by an image capturing apparatus, including at least one processor, and a memory coupled to the at least one processor, the memory having instructions that, when executed by the processor, perform the operations as: a light emission controller configured to control light emission of a light emission section, and a communication section configured to communicate with the image capturing apparatus and acquire setting information of the image capturing apparatus before image capturing, wherein in a case where the acquired setting information indicates a mode of repeating image capturing at high speed, the communication section communicates information which is different from information on the light amount of main emission and is used for settings of preliminary light emission or main light emission, by dividing the information into information communicated by a first communication processing before preliminary light emission and information communicated by a second communication processing after preliminary light emission.

In a third aspect of the embodiments, there is provided a method method of controlling an image capturing apparatus, including executing a light control process for determining a light amount of main emission by the lighting device by causing the lighting device to perform preliminary light emission, and communicating, in a case where an image capturing frequency for repeating image capturing is higher than a threshold value, information which is different from information on the light amount of main emission and is used for the settings of preliminary light emission or main light emission, by dividing the information into information communicated by a first communication processing before preliminary light emission and information communicated by a second communication processing after preliminary light emission.

In a fourth aspect of the embodiments, there is provided a method of controlling a lighting device used for image capturing by an image capturing apparatus, including acquiring setting information of the image capturing apparatus before image capturing, and communicating, in a case where the setting information indicates a mode of repeating image capturing at high speed, information which is different from information on the light amount of main emission and is used for settings of preliminary light emission or main light emission, by dividing the information into information communicated by a first communication processing before preliminary light emission and information communicated by a second communication processing after preliminary light emission.

Further features of the disclosure will become apparent from the following description of exemplary embodiments (with reference to the attached drawings).

BRIEF DESCRIPTION OF THE DRAWINGS

FIG. 7 is a flowchart of a variation of the automatic light control process performed by the strobe MPU appearing in FIG. 5 during continuous shooting.

DESCRIPTION OF THE EMBODIMENTS

The disclosure will now be described in detail below with reference to the accompanying drawings showing embodiments thereof. However, the description of configurations of the following embodiments is given only by way of example and is by no means intended to limit the scope of the disclosure.

Figure 1:
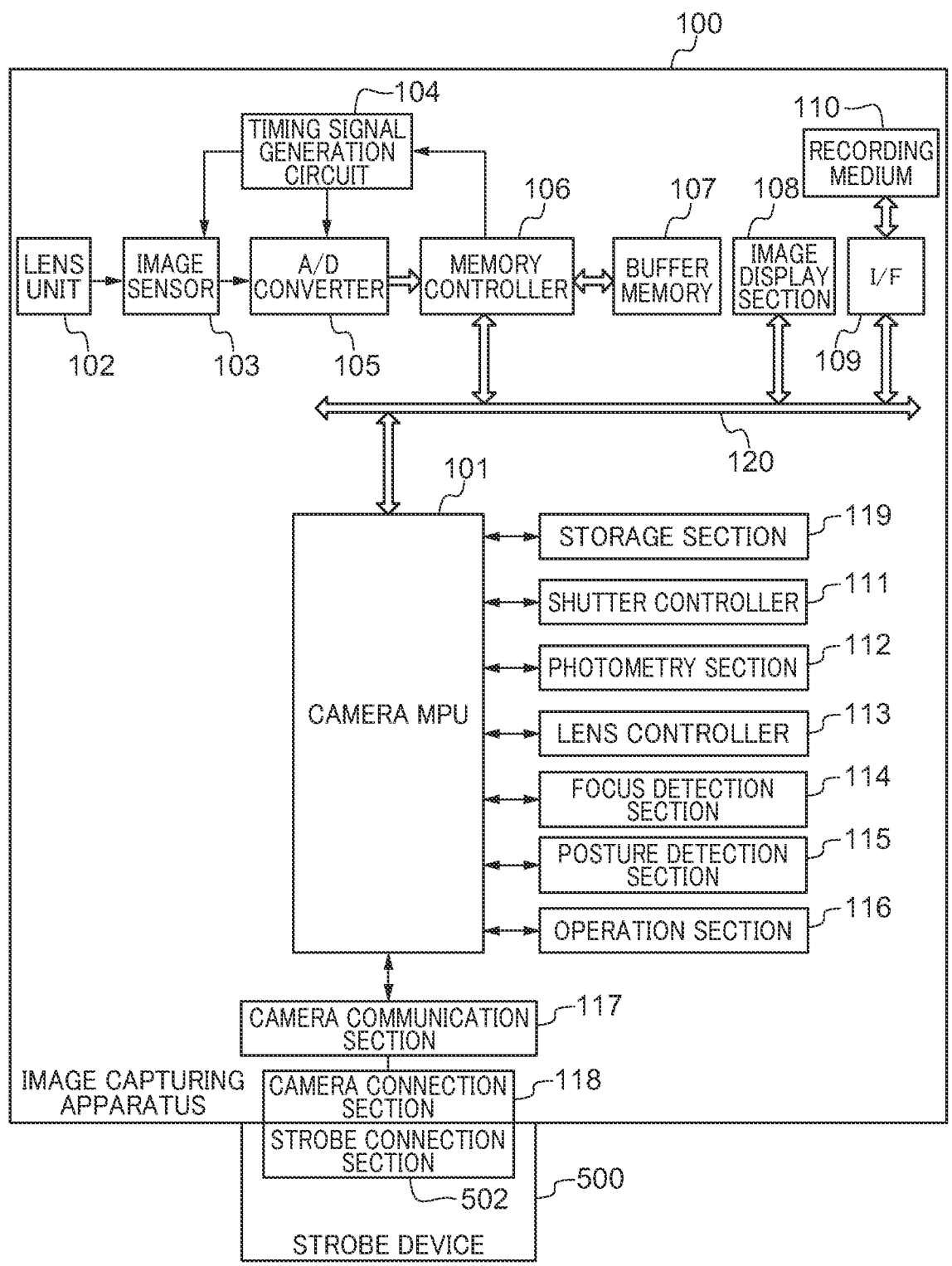
FIG. 1 is a block diagram of an image capturing apparatus according to one or more aspects of the present disclosure.

FIG. 1 is a block diagram of an image capturing apparatus 100 according to a first embodiment of the disclosure. FIG. 1 also shows an external strobe device 500 as a lighting device attached to the image capturing apparatus 100. The strobe device 500 may be the same as that shown in FIG. 5, described hereinafter. The image capturing apparatus 100 shown in FIG. 1 includes a lens unit 102 and an image sensor 103, as an optical system for capturing an image of an object. Further, as a system for processing an image captured by the image sensor 103, the image capturing apparatus 100 includes a timing signal generation circuit 104, an analog-to-digital converter 105, a memory controller 106, and a buffer memory 107. The lens unit 102 includes, for example, a diaphragm adjustment mechanism and a focus adjustment mechanism, and causes a light flux containing incident light of an object to form an image on the image sensor 103. The timing signal generation circuit 104 generates a timing signal required to operate the image sensor 103 and outputs the generated timing signal to the image sensor 103. The image sensor 103 may be a CCD or CMOS sensor having a plurality of photoelectric conversion elements arranged on a light receiving surface. The photoelectric conversion elements each accumulate an electric charge corresponding to an amount of received light. The image sensor 103 converts light in an image capturing range including an object to electrical signals using the plurality of photoelectric conversion elements to generate analog image data. Further, the image sensor 103 can also be used as a photometry sensor that measures an amount of received light. The analog-to-digital converter 105 converts the analog image data output from the image sensor 103 to digital image data. The memory controller 106 controls a refresh operation and the like of the buffer memory 107 and records the digital image data in the buffer memory 107.

The image capturing apparatus 100 shown in FIG. 1 includes a storage section 119, a shutter controller 111, a photometry section 112, a lens controller 113, a focus detection section 114, a posture detection section 115, an operation section 116, a camera communication section 117, and a camera MPU 101 to which these components are connected. To the camera MPU 101, a system bus 120 is further connected. To the system bus 120, the memory controller 106, an image display section 108, and an interface 109 for a recoding medium 110 are connected. The storage section 119 is a nonvolatile memory, such as a ROM and an HDD, and records programs executed by the camera MPU 101, design parameters, setting data, and so forth. The camera MPU 101 may be a microcontroller. The microcontroller may incorporate the storage section 119 and a timer. The camera MPU 101 loads the programs recorded in the storage section 119 into a RAM, not shown, and executes the loaded programs. With this, the camera MPU 101 functions as a controller that controls the overall operation of the image capturing apparatus 100. The image display section 108 displays image data stored e.g. in the buffer memory 107 as a live view image. The image display section 108 may display not only the image data, but also a variety of settings, such as a current image capturing mode and exposure parameters, in the form of icons or the like. The recording medium 110 may be a nonvolatile memory, such as a memory card and a hard disk. The recording medium 110 may be removable from the image capturing apparatus 100. The interface 109 accumulates and records image data stored in the buffer memory 107 and image data obtained by processing the stored image data, in the recording medium 110. The interface 109 may be one for connection with a wireless communication section, not shown. The shutter controller 111 controls opening/closing of a shutter, not shown, which is disposed in front of the image sensor 103 such that the shutter covers the image sensor 103, and switches the image sensor 103 between a light blocked state and an image capturing state according to a signal received from the camera MPU 101. The photometry section 112 outputs to the camera MPU 101 a photometric value as a result of photometry performed based on an output from each of a plurality of areas into which an imaging surface of the image sensor 103 is divided. In accordance with this, the camera MPU 101 performs exposure calculation for determining an AV (aperture value), a TV (shutter speed), an ISO (image capturing sensitivity), and so forth, as the exposure parameters to be set when image capturing is performed, based on the photometric values obtained from the respective areas. Further, in a case where the strobe device 500 performs preliminary light emission toward an object (pre-flash), the camera MPU 101 can calculate a light amount of main emission of the strobe device 500, which is to be set when image capturing is performed, based on the photometric values output from the photometry section 112 when the preliminary light emission is performed. The lens controller 113 controls a lens driving motor and a diaphragm driving motor, neither of which is shown, according to a signal received from the camera MPU 101. With this, the focus and the aperture of the lens unit 102 are adjusted. Further, the lens controller 113 acquires lens information from the lens unit 102 according to a signal received from the camera MPU 101 and outputs the acquired lens information to the camera MPU 101. The camera MPU 101 can acquire the lens information at the time of preliminary light emission or the lens information at the time of main light emission as image capturing information. The focus detection section 114 outputs a defocus amount at each ranging point to the camera MPU 101 based on an output from a focus detection sensor having a plurality of ranging points within the imaging surface. This enables the camera MPU 101 to adjust the focus to be instructed to the focus detection section 114 based on the defocus amounts. The posture detection section 115 is e.g. an acceleration sensor, and detects a posture of the image capturing apparatus 100 with reference to a gravity direction. The posture detection section 115 outputs information on a detected posture of the image capturing apparatus 100 to the camera MPU 101. The operation section 116 includes a release button operated by a user to perform an image capturing operation, other buttons, a touch panel superposed on the image display section 108, and so forth. When the release button is operated by a first stroke (half depressed) to turn on a SW1, not shown, thereof, the release button outputs an on signal of the SW1 to the camera MPU 101. This causes the camera MPU 101 to start an image capturing preparation operation, such as a focus detection operation and a photometry operation. When the release button is operated by a second stroke (fully depressed) to turn on a SW2, not shown, thereof, the release button outputs an on signal of the SW2 to the camera MPU 101. This causes the camera MPU 101 to start an image capturing operation. In a case where a light amount is insufficient for image capturing, the camera communication section 117 causes the strobe device 500 to perform preliminary light emission before causing the strobe device 500 to perform main light emission for image capturing. The camera communication section 117 controls a light emission pattern and a light amount of the preliminary light emission, calculates a light emission pattern and a light amount of the main light emission by performing a light control process based on a result of the preliminary light emission, and causes the strobe device 500 to perform the main light emission according to the calculation result for image capturing. In a case where the strobe device 500 used for image capturing is external, the camera MPU 101 controls communication with the strobe device 500.

The camera communication section 117 communicates with the strobe device 500. The strobe device 500 is attached to the apparatus body used for an image capturing operation performed by the image capturing apparatus 100. The strobe device 500 is attached to the image capturing apparatus 100 such that a strobe connection section 502 is connected to a camera connection section 118 of the image capturing apparatus 100. The camera communication section 117 and the strobe device 500 execute data communication via the strobe connection section 502 and the camera connection section 118 under the communication control of the camera MPU 101. The camera MPU 101 acquires a variety of kinds of information, such as charge completion information indicating the charged state of the strobe device 500, by receiving the same from the strobe device 500 using the camera communication section 117. In a case where the strobe device 500 is in a charged state capable of emitting light, the camera MPU 101 transmits an instruction about a light emission pattern and a light amount of preliminary light emission and an instruction about a light emission pattern and a light amount of main emission, to the strobe device 500 using the camera communication section 117. The camera MPU 101 may periodically communicate with the strobe device 500 using the camera communication section 117. The camera MPU 101 may cause the strobe device 500 to perform preliminary light emission before each image capturing operation (main light emission) e.g. during continuous shooting to acquire information on a result of the preliminary light emission, and execute the light control process for main light emission for each image capturing operation. However, in this case, the camera MPU 101 is required to execute communication concerning the preliminary light emission with the strobe device 500, execute calculation of the light control process, and execute communication concerning the main light emission with the strobe device 500 before each image capturing (main light emission) during continuous shooting. It takes a predetermined time period to perform the series of these processing operations. In a case where continuous shooting is performed using the strobe device 500, there is a possibility that it is impossible to make the image capturing frequency at which the image capturing operation can be repeated higher than a predetermined frequency (impossible to make the image capturing interval shorter than a predetermined interval) due to this time period from the preliminary light emission to the light control process.

Figure 2:
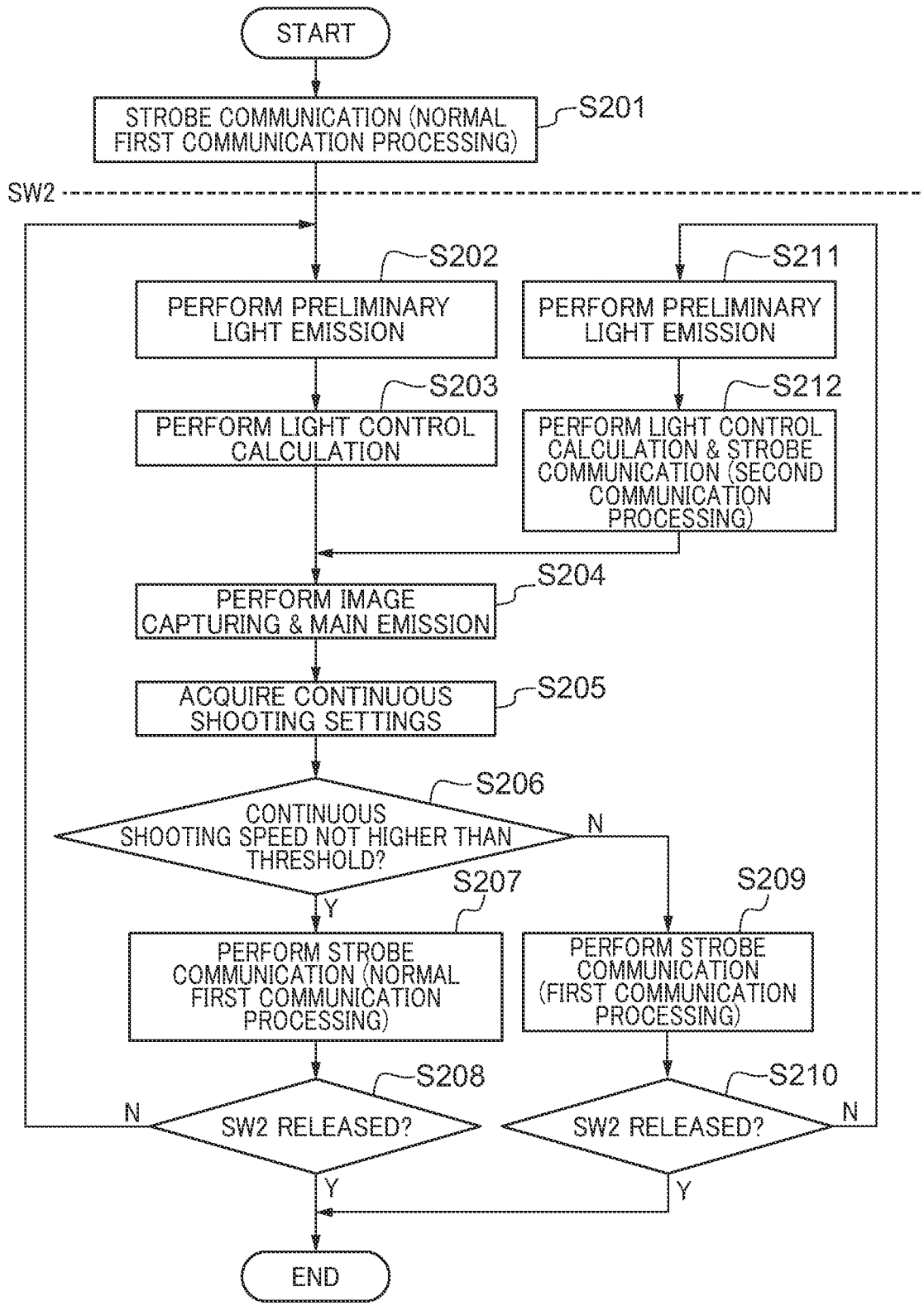
FIG. 2 is a flowchart of an automatic light control process performed by a camera MPU appearing in FIG. 1 during continuous shooting.

FIG. 2 is a flowchart of an automatic light control process performed by the camera MPU 101 appearing in FIG. 1 during continuous shooting. The camera MPU 101 of the image capturing apparatus 100 may repeatedly execute the automatic light control process in FIG. 2 whenever an image capturing operation is started in the continuous shooting. In a step S201, the camera MPU 101 communicates with the external strobe device 500 attached to the apparatus body for being used for the image capturing operation, by strobe communication regularly performed using the camera communication section 117 during activation of the camera. The camera MPU 101 and the strobe device 500 exchange information, including strobe charge completion information, strobe setting information, camera setting information, and lens focal length information. The camera MPU 101 can determine whether or not it is possible to perform image capturing using the strobe device 500 based on these items of information. Then, when a user operates the release button of the operation section 116 by the second stroke (full depression) to turn on the SW2 while the regular strobe communication is repeated, the camera MPU 101 proceeds to a step S202 based on settings at the time of this operation. In the step S202, the camera MPU 101 determines the light emission conditions of preliminary light emission, such as a light emission method and a light emission amount (peak value), based on the information communicated in the step S201, and causes the strobe device 500 to perform the preliminary light emission. Further, the camera MPU 101 performs image capturing on the image sensor 103 simultaneously with the preliminary light emission. The photometry section 112 performs photometry on an object under the preliminary light emission. The camera MPU 101 measures a degree of influence of the preliminary light emission on the object based on a result of the photometry on the object under the preliminary light emission. In doing this, a comparison between a result (non-light emission photometry result) of the photometry performed on the object in a state in which the strobe device is not caused to emit light and a result (preliminary light emission photometry result) of the photometry performed on the object in a state in which the strobe device is caused to emit light makes it possible to measure a degree of influence of the preliminary light emission on the object with higher accuracy. Here, the camera MPU 101 executes strobe communication (normal first communication processing) in the step S201 before the preliminary light emission in the step S202. The camera MPU 10, as an image capturing communication section, acquires, even in a case where image capturing is repeated, information which is different from main emission amount information of first main emission of the strobe device 500 and is used for settings of preliminary light emission or settings of main light emission, only by the normal first communication processing before the preliminary light emission. Here, the information which is different from the main emission amount information and is used for the settings of preliminary light emission or the settings of main light emission may include not only the charge completion information of the strobe device 500, but also at least one of the strobe setting information of the strobe device 500, and the camera setting information and the lens focal length information of the image capturing apparatus 100.

In a step S203, the camera MPU 101 determines the main light emission amount for capturing a still image by light control calculation (also referred to as the light control process) based on the information on a result of the preliminary light emission in the step S202. The camera MPU 101 may receive and acquire the information on a result of the preliminary light emission in the step S202 from the strobe device 500 by communicating with the strobe device 500 using the camera communication section 117. The camera MPU 101 may acquire the information on a result of the preliminary light emission from the strobe device 500 as the image capturing communication section. In this case, the camera MPU 101 as an automatic light control unit can execute the light control process for determining a light amount of main emission of the strobe device 500 in the main image capturing operation based on a photometry result on the object under the preliminary light emission. In a step S204, the camera MPU 101 executes image capturing of a still image with the main light emission. The camera MPU 101 communicates with the strobe device 500 using the camera communication section 117 to transmit the settings of light emission, such as the main emission light amount determined in the step S203, before image capturing. The strobe device 500 execute the main light emission at an image capturing timing. The camera MPU 101 performs image capturing by the image sensor 103 simultaneously with the main light emission. The camera MPU 101 transfers digital image data obtained by the first image capturing operation in continuous shooting to the recording medium 110 via the interface 109 to record the digital image data in the recording medium 110.

In a step S205, the camera MPU 101 acquires continuous shooting settings. The camera MPU 101 may acquire the continuous shooting settings from a nonvolatile memory, such as the storage section 119. In a step S206, the camera MPU 101 calculates a continuous shooting speed corresponding to the actual image capturing frequency based on the continuous shooting settings acquired in the step S205. Then, for example, the camera MPU 101 compares the calculated continuous shooting speed and a predetermined threshold value. With this, the camera MPU 101 can determine whether or not the image capturing frequency for repeating image capturing is higher than the threshold value by determining whether or not the continuous shooting speed based on the continuous shooting settings of the image capturing apparatus 100 exceeds the threshold value. Here, the threshold value may be set to an upper limit value of the continuous shooting speed executable even when the same communication as in the strobe communication performed in the step S201 is performed after image capturing. In this case, continuous shooting at a continuous shooting speed exceeding the threshold value becomes difficult to be actually executed if normal strobe communication is performed.

If the calculated continuous shooting speed does not exceed the threshold value, the camera MPU 101 proceeds to a step S207. If the calculated continuous shooting speed exceeds the threshold value, the camera MPU 101 proceeds to a step S209.

In the step S207, the continuous shooting to be executed based on the settings has the continuous shooting speed which does not exceed the threshold value, and even when the normal strobe communication (normal first communication processing) is performed, there is no adverse influence on the continuous shooting, and hence the camera MPU 101 executes the same strobe communication as in the step S201. In a case where the continuous shooting speed for repeating image capturing does not exceed the threshold value, the camera MPU 101 can acquire the information which is different from the main emission amount information of the strobe device 500 and is used for the settings of preliminary light emission or the settings of main light emission, only by the normal first communication processing before the preliminary light emission. In a step S208, the camera MPU 101 determines whether or not the user has released the second stroke operation on the release button of the operation section 116. If it is determined that the second stroke operation on the release button is discontinued, the camera MPU 101 terminates the automatic light control process during continuous shooting in FIG. 2. If it is determined that the second stroke operation on the release button is continued, the process returns to the step S202. Thus, the camera MPU 101 repeats the steps S202 to S208 as long as the second stroke operation on the release button is continued. Here, the camera MPU 101 executes the strobe communication (normal first communication processing) in the step S207 before the preliminary light emission in the step S202. The camera MPU 101 causes the strobe device 500 to perform the preliminary light emission based on the strobe communication performed before preliminary light emission in the step S207. Further, if it is determined in the step S208 that the second stroke operation on the release button is discontinued, the camera MPU 101 terminates the automatic light control process during continuous shooting in FIG. 2.

In the step S209, differently from the step S201 or S207, the camera MPU 101 executes the strobe communication (first communication processing) for transmitting and receiving only part of the information so as to reduce the amount of communication. In a case where the continuous shooting speed for repeating image capturing exceeds the threshold value, it is impossible for the camera MPU 101 to secure enough time to communicate the same amount of communication as that of the normal strobe communication (normal first communication processing). To cope with this, the camera MPU 101 executes the first communication processing before preliminary light emission, for transmitting and receiving only part of the information which is different from the main emission amount information of the strobe device 500 and is used for the settings of preliminary light emission or the settings of main light emission. The information transmitted and received by the first communication processing before preliminary light emission is e.g. the charge completion information of the strobe device 500. Unless the charge completion information is received by the image capturing apparatus 100, the image capturing apparatus 100 considers that the strobe device 500 is in a state incapable of performing preliminary light emission and cannot transmit a preliminary light emission instruction, and hence the charge completion information of the strobe device 500 is transmitted and received by the first communication processing. Although the other information may be transmitted and received before preliminary light emission, if the amount of communication becomes too large, it takes longer time to perform the communication, and hence the information to be transmitted and received may be changed according to the continuous shooting speed. With this, it is possible to reduce the time of the strobe communication before preliminary light emission. In a step S210, the camera MPU 101 determines whether or not the user has released the second stroke operation on the release button as in the step S208. If it is determined that the second stroke operation on the release button is discontinued, the camera MPU 101 terminates the automatic light control process during continuous shooting in FIG. 2. If it is determined that the second stroke operation on the release button is continued, the process proceeds to a step S211.

In the step S211, the camera MPU 101 determines the light emission conditions, such as a light emission method and a light emission amount (peak value) of preliminary light emission, using the information communicated in the step S209. Here, in a case where the information communicated in the step S209 is only the charge completion information, the camera MPU 101 is only required to substitute the information which has been acquired before, such as the information acquired by the communication in the step S201, for the information which has not been acquired in the communication in the step S209. The camera MPU 101 may use the strobe setting information of the strobe device 500 as a substitute. The camera MPU 101 causes the strobe device 500 to perform preliminarily light emission according to the determined light emission conditions. Further, the camera MPU 101 performs an image capturing operation by the image sensor 103 simultaneously with the preliminary light emission. The photometry section 112 performs photometry on the object under the preliminary light emission. The camera MPU 101 measures a degree of the influence of the preliminary light emission on the object based on a result of the photometry on the object under the preliminary light emission.

In a step S212, the camera MPU 101 executes strobe communication for transmitting and receiving the rest of information, which has not been transmitted and received in the step S209. Further, the camera MPU 101 determines the main emission light amount to be used for capturing a still image by light control calculation based on the acquired information used for the settings of main light emission and the measurement result obtained in the step S212, simultaneously in parallel with the strobe communication. The camera MPU 101 may determine the main emission light amount to be used when a still image is captured, by light control calculation by the same calculation processing as in the step S203. At this time, the information which has not been acquired by the first communication in the step S209, and is communicated after the preliminary light emission but not in time to be reflected on the light control calculation may be substituted by the information which has been acquired before (e.g. one frame before). For example, in a case where light distribution of the strobe device 500 at the main light emission is controlled by using the lens focal length information acquired one frame before as a substitute, although a difference is generated between the information used as a substitute and the lens focal length information at the present time, the adverse influence of the difference is small since the continuous shooting speed is so fast as to exceed the threshold value.

As described above, in the case where the continuous shooting speed for repeating image capturing exceeds the threshold value, the camera MPU 101 acquires the information which is different from the main emission amount information and is used for the settings of preliminary light emission or main light emission, by dividing the information into information acquired by the first communication processing before preliminary light emission and information acquired by the second communication processing after preliminary light emission. Note that the sum of the amount of communication of the first communication processing in the step S209 and the amount of communication of the second communication processing in the step S212 is not required to be equal to the amount of communication of the strobe communication (normal first communication processing) performed in the step S201 or S207. Thus, by communicating not all of the information which is different from the main emission amount information and is used for the settings of preliminary light emission or main light emission, before preliminary light emission, but communicating part of the information simultaneously in parallel with the light control calculation after preliminary light emission, it is possible to efficiently perform communication within a limited time during continuous shooting.

After that, the camera MPU 101 proceeds to the step S204. In a case where the continuous shooting speed for repeating image capturing exceeds the threshold value and can be limited as described above, the camera MPU 101 repeats the steps S209 to S212 and the steps S204 to S206. The camera MPU 101 repeats the series of processing operations until it is determined in the step S208 that the second stroke operation on the release button is discontinued. The camera MPU 101 repeatedly executes the first communication processing before preliminary light emission and the second communication processing after preliminary light emission in each image capturing operation in the continuous shooting. Further, if it is determined in the step S208 that the second stroke operation on the release button is discontinued, the camera MPU 101 terminates the automatic light control process during continuous shooting in FIG. 2.

Figure 3:
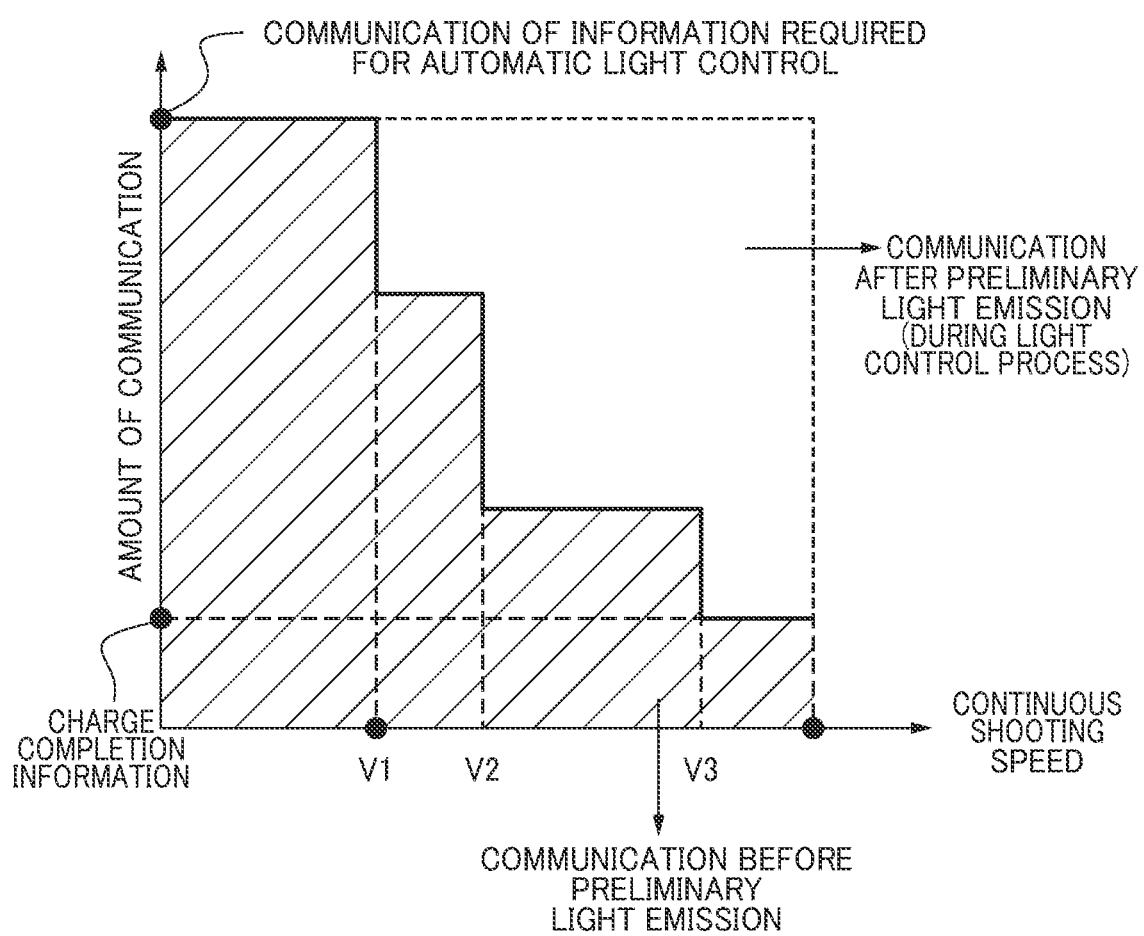
FIG. 3 is an explanatory diagram showing a relationship between a continuous shooting speed of continuous shooting and threshold values for switching communication for transmitting preliminary light emission result information of a strobe device during continuous shooting.

FIG. 3 is an explanatory diagram showing a relationship between the continuous shooting speed of continuous shooting and the threshold values, for switching communication for transmitting preliminary light emission result information of the strobe device 500 during continuous shooting. A horizontal axis in FIG. 3 represents the continuous shooting speed. A vertical axis represents the amount of information communicated in each image capturing operation in continuous shooting. The amount of communication includes the charge completion information of the strobe device 500. In FIG. 3, as the threshold values of the continuous shooting speed, a first threshold speed V1, a second threshold speed V2, and a third threshold speed V3 are set. These information items in FIG. 3 may be recorded in the storage section 119. The camera MPU 101 may refer to the storage section 119 and compare the continuous shooting speed based on the continuous shooting settings of the image capturing apparatus 100 with these three threshold speeds of the first threshold speed V1, the second threshold speed V2, and the third threshold speed V3. Then, in a case where the continuous shooting speed based on the continuous shooting settings of the image capturing apparatus 100 does not exceed the first threshold speed V1, the camera MPU 101 communicates the information which is different from the main emission amount information and is used for the settings of preliminary light emission or main light emission, only by the normal first communication processing before preliminary light emission. In a case where the continuous shooting speed based on the continuous shooting settings of the image capturing apparatus 100 exceeds the first threshold speed V1 but does not exceed the second threshold value V2, the camera MPU 101 communicates half or more of the information which is different from the main emission amount information and is used for the settings of preliminary light emission or main light emission, by the first communication processing before preliminary light emission. The camera MPU 101 communicates the rest of the information by the second communication processing after preliminary light emission, which is executed simultaneously in parallel with the light control process. In a case where the continuous shooting speed based on the continuous shooting settings of the image capturing apparatus 100 exceeds the second threshold speed V2 but does not exceed the third threshold value V3, the camera MPU 101 communicates the half or less of the information which is different from the main emission amount information and is used for the settings of preliminary light emission or main light emission, by the communication before preliminary light emission. The camera MPU 101 communicates the rest of the information by the second communication processing after preliminary light emission, which is executed simultaneously in parallel with the light control process. In a case where the continuous shooting speed based on the continuous shooting settings of the image capturing apparatus 100 exceeds the third threshold value V3, the camera MPU 101 acquires, out of the information which is different from the main emission amount information and is used for the settings of preliminary light emission or main light emission, only the charge completion information, by the first communication processing before preliminary light emission. The camera MPU 101 communicates the rest of the information by the second communication processing after preliminary light emission, which is executed simultaneously in parallel with the light control process.

By executing the above-described switching control for dividing the amount of communication, the amount of communication and the communication time of the first communication processing before preliminary light emission can be increased/reduced so as not to adversely affect the continuous shooting speed. The camera MPU 101 reduces the amount of information acquired by the first communication processing before preliminary light emission and increases the amount of information acquired by the second communication processing after preliminary light emission according to how much degree the continuous shooting speed exceeds the threshold value. The strobe communication time is prevented from adversely affecting the continuous shooting speed, and it is possible to realize the continuous shooting speed exceeding the limit imposed in a case where the communication is performed only by the first communication processing before preliminary light emission. Further, the camera MPU 101 can acquire at least the charge completion information of the strobe device 500 by the first communication processing before preliminary light emission.

Figure 4:
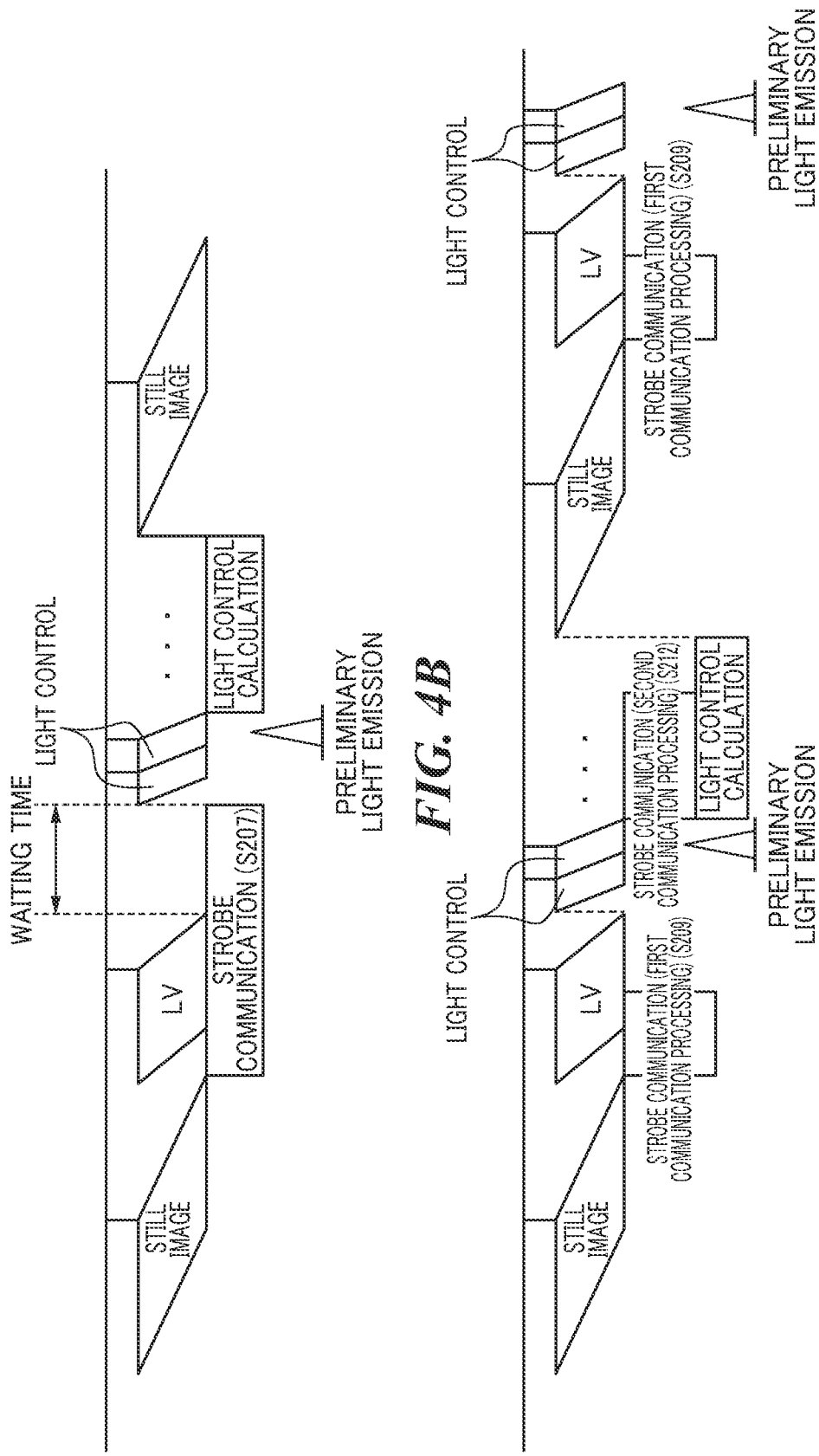
FIGS. 4A and 4B are timing diagrams of the automatic light control process performed during continuous shooting of the image capturing apparatus shown in FIG. 1.

FIGS. 4A and 4B are timing diagrams of the automatic light control process performed during continuous shooting of the image capturing apparatus shown in FIG. 1. FIG. 4A is a timing diagram in a case where only the first communication processing before preliminary light emission is executed in each image capturing operation during continuous shooting. In a case where the steps S202 to S208 in FIG. 2 are repeated and the strobe communication in the step S207 is executed, the timing chart becomes as shown in FIG. 4A. In FIG. 4A, after image capturing for a preceding still image is performed, image capturing for live view is performed together with strobe communication after the preceding image capturing operation, and the preliminary light emission is performed. Thereafter, the light control calculation is executed, and image capturing for the next still image is performed. Assuming that the strobe communication continues to be executed after image capturing for live view is terminated as shown in FIG. 4A, this continuation time becomes a waiting time, and the timing of preliminary light emission is delayed. A time period from the preceding image capturing operation to the next image capturing operation becomes long, whereby the continuous shooting is limited.

FIG. 4B is a timing diagram in a case where the second communication processing after preliminary light emission is executed in combination with the first communication processing before preliminary light emission in each image capturing operation during continuous shooting. In a case where the steps S209 to S212 and the steps S204 to S206 in FIG. 2 are repeated and the strobe communication in the step S209 and the step S212 is executed, the timing chart becomes as shown in FIG. 4B. In FIG. 4B, after image capturing for a preceding still image is performed, image capturing for live view is performed together with short-time strobe communication before preliminary light emission after the preceding image capturing operation, and the preliminary light emission is performed. Then, the light control calculation is executed with strobe communication after preliminary light emission, and image capturing for the next still image is performed. In FIG. 4B, the strobe communication before preliminary light emission is terminated before image capturing for live view is terminated. In this case, it is possible to execute the preliminary light emission in an early timing without generating such a waiting time as shown in FIG. 4A. A time period from the preceding image capturing operation to the next image capturing operation becomes short, and the continuous shooting is difficult to be limited. This makes it possible to prevent reduction of the continuous shooting speed.

As described above, in the present embodiment, the image capturing communication section communicates with the strobe device 500 attached to the apparatus body for use in image capturing and communicates the information which is different from the main emission amount information and is used for the settings of preliminary light emission or main light emission. Then, if the image capturing frequency for repeating image capturing is higher than the threshold value, the image capturing communication section acquires the information on a result of the preliminary light emission of the strobe device 500 by dividing the information into information acquired by the first communication processing before preliminary light emission and information acquired by the second communication processing after preliminary light emission. The automatic light control unit executes the light control process for determining a light amount of main emission of the strobe device 500 based on the latest preliminary light emission result information of the strobe device 500, which is acquired by the image capturing communication section, when each image capturing operation is performed in continuous shooting. In doing this, the automatic light control unit can execute the light control process for determining a light amount of main emission of the strobe device 500 in the main image capturing operation simultaneously with the second communication processing after preliminary light emission, performed by the image capturing communication section, by using the information acquired by the first communication processing before preliminary light emission. As a result, in the present embodiment, the second communication processing after preliminary light emission performed by the image capturing communication section and the light control process for determining a light amount of main emission of the strobe device 500 in the main image capturing operation are executed simultaneously in parallel. With this, in the present embodiment, it is possible to reduce the time required from the preliminary light emission to the main light emission of the strobe device 500 and cope with the high image capturing frequency. In the present embodiment, compared with the case where all information of the light emission result is acquired after preliminary light emission to execute the light control process, it is possible to reduce the time required from preliminary light emission to main light emission.

In the present embodiment, acquisition of the information of the preliminary light emission result and the light control process are executed simultaneously in parallel, whereby it is possible to increase the speed of continuous shooting. Even when the image capturing apparatus 100 controls the driving of the image sensor 103 which is increased in data-readout speed, using the electronic shutter system, it is possible to improve the continuous shooting speed of the continuous strobe shooting without being adversely affected by the time of communication with the strobe device 500, and the like. The image capturing apparatus 100 can continue image capturing at a high continuous shooting speed in continuous shooting performed by causing the strobe device 500 to emit light synchronously. The image capturing apparatus 100 can continue, in continuous shooting performed by causing the strobe device 500 to emit light synchronously, image capturing at a high continuous shooting speed while executing e.g. strobe zoom control coordinated with the lens focal length without limiting the same.

Next, a second embodiment of the disclosure will be described. In the second embodiment, not the image capturing apparatus 100, but the strobe device 500 determines switching of the strobe communication.

Figure 5:
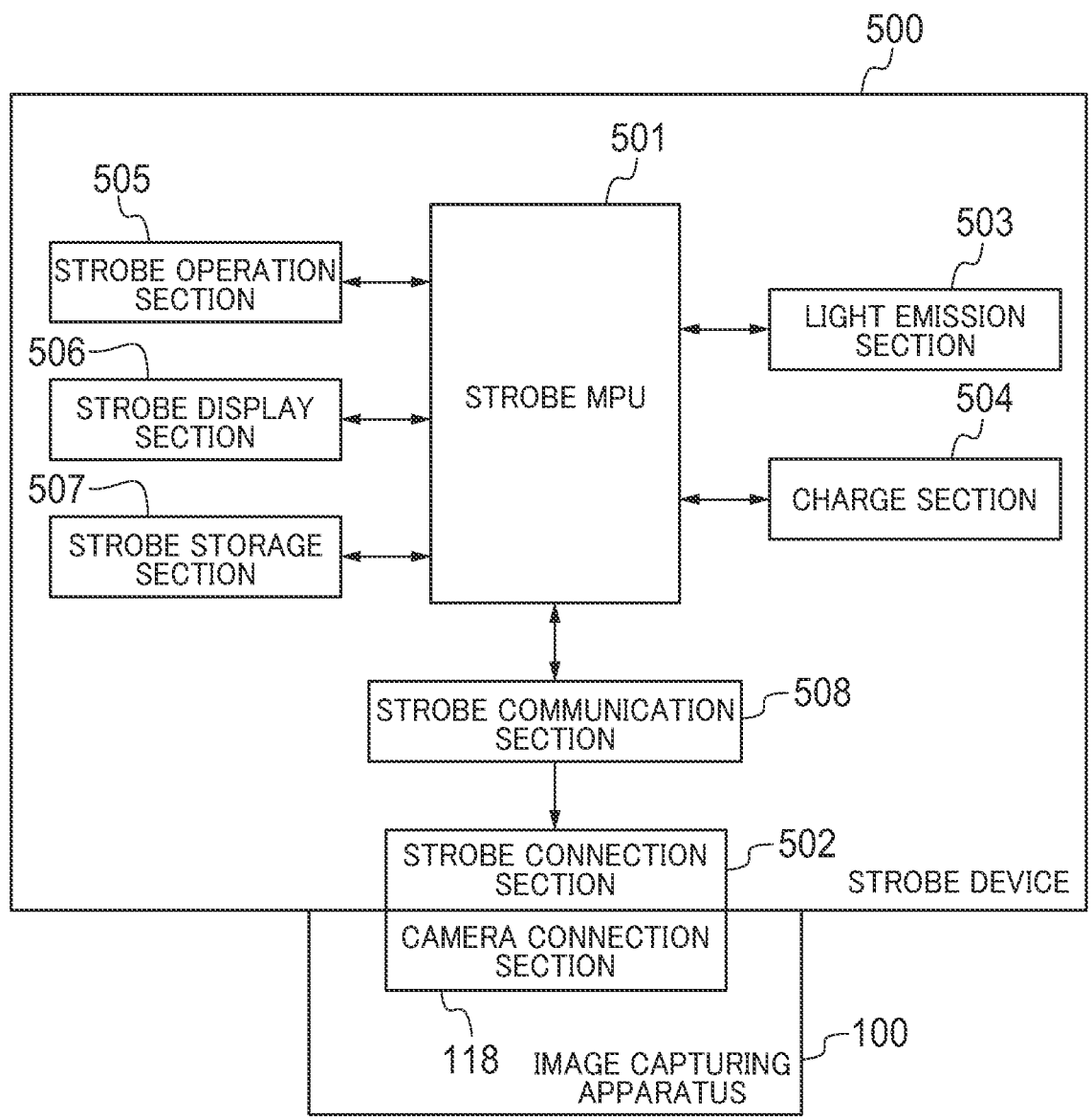
FIG. 5 is a block diagram of the strobe device according to one or more aspects of the present disclosure.

FIG. 5 is a block diagram of the strobe device 500 according to the second embodiment of the disclosure. FIG. 5 also shows the image capturing apparatus 100 to which the strobe device 500 is attached. The image capturing apparatus 100 may be the same as that shown in FIG. 1. The strobe device 500 shown in FIG. 5 has a strobe MPU 501. A light emission section 503, a charge section 504, a strobe operation section 505, a strobe display section 506, and a strobe storage section 507 are connected to the strobe MPU 501. The strobe storage section 507 is a semiconductor memory, such as a ROM, and records programs executed by the strobe MPU 501, design parameters, setting information of the strobe operation section 505, and so forth. The strobe MPU 501 may be a microcontroller. The microcontroller may incorporate the strobe storage section 507 and a timer. The strobe MPU 501 loads the programs recorded in the strobe storage section 507 into a RAM, not shown, and executes the loaded programs. With this, the strobe MPU 501 functions as a controller that controls the overall operation of the strobe device 500. The strobe connection section 502 is connected to the camera connection section 118 of the image capturing apparatus 100 and executes strobe communication with the image capturing apparatus 100. The light emission section 503 includes e.g. a light emission circuit, a light emission capacitor, and a discharge tube. The light emission section 503 drives the light emission circuit according to an instruction received from the strobe MPU 501 to emit light from the discharge tube by discharging energy charged in the light emission capacitor to the discharge tube. Light emitted from the discharge tube is irradiated onto an object. The charge section 504 charges the light emission capacitor of the light emission section 503 using electric power of a battery, not shown, equipped in the strobe device 500. The strobe operation section 505 includes e.g. buttons and a dial, which are operated by a user. The strobe operation section 505 outputs a signal based on a user operation to the camera communication section 117. The strobe operation section 505 outputs e.g. setting information of a light emission mode of the strobe to the camera communication section 117. The light emission mode of the strobe includes e.g. a "continuous shooting speed priority mode" for giving the priority to the continuous shooting speed of image capturing. The strobe display section 506 displays e.g. the light emission mode according to an instruction received from the camera communication section 117. In the strobe device 500 used for image capturing performed by the image capturing apparatus 100, the strobe MPU 501 as a light emission controller controls light emission of the light emission section 503 and controls strobe communication with the image capturing apparatus 100 via a strobe communication section 508. In the strobe communication, for example, the image capturing setting information for causing the light emission section 503 to perform preliminary light emission before image capturing may be acquired based on a setting operation performed on the strobe operation section 505.

Figure 6:
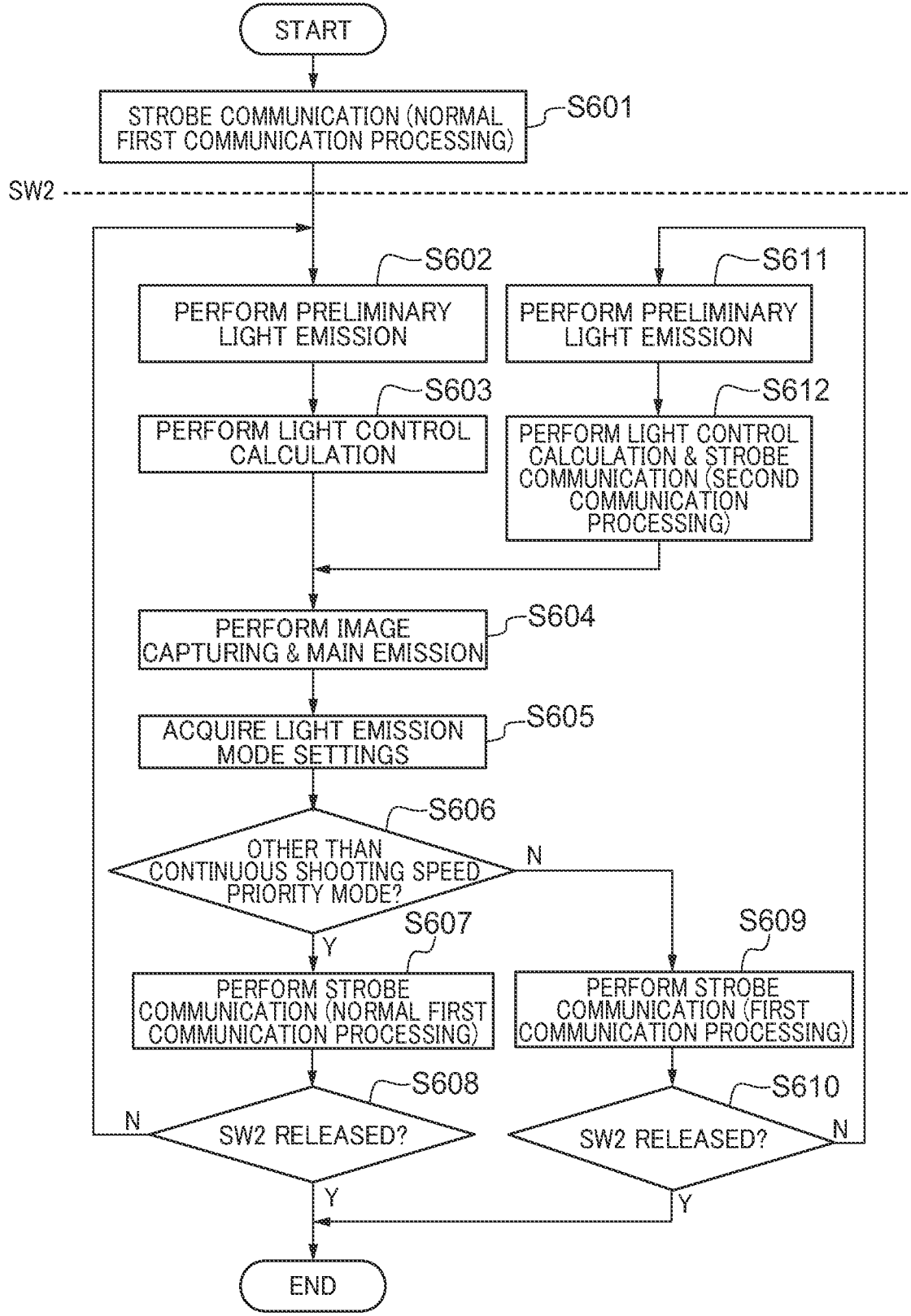
FIG. 6 is a flowchart of an automatic light control process performed by a strobe MPU appearing in FIG. 5 during continuous shooting.

FIG. 6 is a flowchart of an automatic light control process performed by the strobe MPU 501 appearing in FIG. 5 during continuous shooting. The strobe MPU 501 may repeatedly execute the automatic light control process in FIG. 6 whenever an image capturing operation is started in continuous shooting. In a step S601, the strobe MPU 501 communicates with the image capturing apparatus 100 to which the strobe device 500 is attached for image capturing, by the regular strobe communication using the strobe communication section 508, which is performed during activation of the camera. The strobe MPU 501 exchanges information with the image capturing apparatus 100, which is different from the main emission amount information and is used for the settings of preliminary light emission or main light emission, such as the strobe charge completion information, the strobe setting information, the camera setting information, and the lens focal length. Then, when a user operates the release button of the operation section 116 by the second stroke (full depression) and the SW2 is turned on while the regular strobe communication is repeated, the strobe MPU 501 proceeds to a step S602 based on the settings set when this operation is performed. In the step S602, the strobe MPU 501 determines the light emission conditions of preliminary light emission, such as a light emission method and a light emission amount (peak value), based on the information communicated in the step S601, and causes the strobe device 500 to perform preliminary light emission. Then, the image capturing apparatus 100 performs an image capturing operation by the image sensor 103 simultaneously with the preliminary light emission. The photometry section 112 of the image capturing apparatus 100 performs photometry on the object under the preliminary light emission. The strobe MPU 501 causes the image capturing apparatus 100 to measure a degree of influence of the preliminary light emission on the object based on a result of the photometry on the object under the preliminary light emission. Here, the strobe MPU 501 has executed the strobe communication in the step S601 before the preliminary light emission in the step S602. Even in a case where image capturing is repeated, before the first image capturing operation is performed, the strobe MPU 501 has acquired the information only by the first communication processing before preliminary light emission as the strobe communication section 508.

In a step S603, the strobe MPU 501 determines the main emission amount for capturing a still image by light control calculation based on the information on a result of the preliminary light emission performed in the step S602. The strobe MPU 501 may communicate with the image capturing apparatus 100 using the strobe communication section 508 to receive and acquire the information on the result of the preliminary light emission performed in the step S602 from the image capturing apparatus 100. The strobe MPU 501 may acquire the information on the result of the preliminary light emission via the strobe communication section 508. In this case, the strobe MPU 501 as the automatic light control unit can execute the light control process for determining a light amount of main emission of the strobe device 500 in the main image capturing based on the result of photometry on the object under the preliminary light emission. In a step S604, the strobe MPU 501 executes the main light emission at a timing of executing image capturing of a still image by the image capturing apparatus 100. The image capturing apparatus 100 transfers digital image data obtained by the first image capturing operation in the continuous shooting to the recording medium 110 via the interface 109 to record therein.

In a step S605, the strobe MPU 501 acquires setting information of the light emission mode in the continuous shooting. The strobe MPU 501 may acquire the setting information of the light emission mode, which is set on the strobe operation section 505, from the strobe storage section 507. In a step S606, the strobe MPU 501 determines whether or not the light emission mode acquired in the step S605 is the "continuous shooting speed priority mode". With this, the strobe MPU 501 can determine whether or not image capturing is to be repeated at a high image capturing frequency. If the light emission mode is the "continuous shooting speed priority mode", the strobe MPU 501 proceeds to a step S609. If the light emission mode is not the "continuous shooting speed priority mode", the strobe MPU 501 proceeds to a step S607.

In the step S607, the strobe MPU 501 executes the strobe communication (normal first communication processing) similar to the step S601. If the light emission mode is not the "continuous shooting speed priority mode", the strobe MPU 501 can acquire the information which is different from the main emission amount information and is used for the settings of preliminary light emission or main light emission, only by the first communication processing before preliminary light emission. In a step S608, the strobe MPU 501 determines whether or not the user has released the second stroke operation on the release button of the operation section 116. If it is determined that the second stroke operation on the release button is discontinued, the strobe MPU 501 terminates the automatic light control process during continuous shooting in FIG. 6. If it is determined that the second stroke operation on the release button is continued, the strobe MPU 501 returns to the step S602. In this case, the strobe MPU 501 repeats the steps S602 to S608 as long as the second stroke operation on the release button is continued. Here, the strobe MPU 501 executes the strobe communication in the step S607 before the preliminary light emission in the step S602. The strobe MPU 501 causes the strobe device 500 to perform the preliminary light emission based on the strobe communication before preliminary light emission in the step S607. Further, if it is determined in the step S608 that the second stroke operation on the release button is discontinued, the strobe MPU 501 terminates the automatic light control process during continuous shooting in FIG. 6.

In the step S609, differently from the step S601 and the step S607, the strobe MPU 501 executes strobe communication for transmitting and receiving part of the information such that the data amount of communication is reduced. If the light emission mode is the "continuous shooting speed priority mode", the strobe MPU 501 executes strobe communication (first communication processing) for transmitting and receiving only part of the information which is different from the main emission amount information and is used for the settings of preliminary light emission or main light emission, before preliminary light emission. This makes it possible to reduce the time of the strobe communication before preliminary light emission. Further, the strobe MPU 501 transmits at least the charge completion information of the strobe device 500 by the first communication processing before preliminary light emission. In a step S610, similar to the step S608, the strobe MPU 501 determines whether or not the user has released the second stroke operation. If the second stroke operation is discontinued, the strobe MPU 501 terminates the automatic light control process during continuous shooting in FIG. 6. If the second stroke operation is continued, the strobe MPU 501 proceeds to a step S611.

In the step S611, the strobe MPU 501 determines the light emission conditions of the preliminary light emission, such as a light emission method and a peak value, using the information (e.g. only the charge completion information) exchanged in the communication in the step S609. At this time, lacking information other than the charge completion information, such as the light emission setting, the lens focal length information, and the camera control values may be substituted by the information communicated in the step S601. The strobe MPU 501 causes the strobe device 500 to perform the preliminary light emission based on the determined light emission conditions. Further, the image capturing apparatus 100 performs an image capturing operation by the image sensor 103 simultaneously with the preliminary light emission, and controls the photometry section 112 to perform photometry on the object under the preliminary light emission. The strobe MPU 501 measures a degree of influence of the preliminary light emission on the object based on a result of the photometry on the object under the preliminary light emission. Here, the strobe MPU 501 executes the strobe communication (first communication processing) in the step S609 before the preliminary light emission in the step S611.

In a step S612, the strobe MPU 501 executes strobe communication (second communication processing) for transmitting and receiving the rest of information, which has not been transmitted and received in the step S609. If the light emission mode is the "continuous shooting speed priority mode", the strobe MPU 501 transmits the information which is different from the main emission amount information and is used for the settings of preliminary light emission or main light emission, by dividing the information into information transmitted by the first communication processing before preliminary light emission and information transmitted by the second communication processing after preliminary light emission. Note that the sum of the amount of communication of the first communication processing in the step S609 and the amount of communication of the second communication processing in the step S612 is not required to be equal to the amount of communication of the strobe communication in the step S601 or S607. Thus, in a case where the image capturing frequency has a possibility of becoming higher than the threshold value, the strobe MPU 501 can transmit and receive the information which is different from the main emission amount information and is used for the settings of preliminary light emission or main light emission, by dividing the information into information acquired by the first communication processing before preliminary light emission and information acquired by the second communication processing after preliminary light emission. Further, the strobe MPU 501 determines the main emission amount for capturing a still image using light control calculation, using the acquired information on the result of the preliminary light emission simultaneously in parallel with the second communication processing after preliminary light emission. The strobe MPU 501 may determine the main emission amount for capturing a still image, using the same light control calculation as in the step S603. At this time, the lacking information which has not been communicated in the shooting speed-based first communication processing in the step S609 may be substituted by the preceding information which has already been acquired by the second communication processing after preliminary light emission.

After that, the strobe MPU 501 proceeds to the step S604. Thus, in a case where the light emission mode of repeating image capturing is the "continuous shooting speed priority mode", the strobe MPU 501 repeats the steps S609 to S612 and the steps S604 to S606. The strobe MPU 501 repeats the series of processing operations until it is determined in the step S608 that the light emission mode is not the "continuous shooting speed priority mode". The strobe MPU 501 repeatedly executes the continuous shooting speed-based first communication processing before preliminary light emission and the second communication processing after preliminary light emission in each image capturing operation in the continuous shooting. Further, if it is determined in the step S608 or the step S610 that the second stroke operation on the release button is discontinued, the strobe MPU 501 terminates the automatic light control process during continuous shooting in FIG. 6.

As described above, in the present embodiment, in a case where the light emission mode of the strobe device 500 is set to the "continuous shooting speed priority mode", the data amount of communication before preliminary light emission is reduced, whereby it is possible to prevent the upper limit of the continuous shooting speed from being adversely affected by the influence of strobe communication.

In the above-described second embodiment, the strobe MPU 501 of the strobe device 500 determines the mode as the acquired setting information and switches transmission of preliminary light emission result information according to the setting of the mode. In addition, the strobe MPU 501 of the strobe device 500 may determine other information, such as a communication rate, and switch transmission of preliminary light emission result information according to the communication rate. FIG. 7 is a flowchart of a variation of the automatic light control process performed by the strobe MPU 501 appearing in FIG. 5 during continuous shooting. The strobe MPU 501 may repeatedly execute not the automatic light control process in FIG. 6, but the automatic light control process in FIG. 7 whenever image capturing in continuous shooting is started. The steps S601 to S612 are the same as those in FIG. 6, and hence description thereof is omitted.

In a step S706, the strobe MPU 501 compares the communication rate in the light emission mode acquired in the step S605 and a threshold value. With this, the strobe MPU 501 can determine whether or not the image capturing frequency for repeating image capturing is higher than the threshold value by determining whether or not the communication rate in the continuous shooting based on the continuous shooting settings of the image capturing apparatus 100 is higher than the threshold value. Here, the threshold value may be set to a value of communication rate corresponding to an upper limit value of the continuous shooting speed executable even when the same communication as the strobe communication (normal first communication processing) performed in the step S601 is performed after image capturing. In this case, continuous shooting at a continuous shooting speed higher than the upper limit value corresponding to the threshold value of the communication rate becomes difficult to be actually executed. If the communication rate in the light emission mode is not higher than the threshold value, the strobe MPU 501 proceeds to the step S609. If the communication rate in the light emission mode is higher than the threshold value, the strobe MPU 501 proceeds to the step S607. With this, the strobe MPU 501 can function as the image capturing communication section. For example, in a case where the acquired setting information is the communication rate not higher than the threshold value set to the communication with the image capturing apparatus 100, the strobe MPU 501 can transmit the information which is different from the main emission amount information and is used for the settings of preliminary light emission or main light emission, by dividing the information into information acquired before preliminary light emission and information acquired after preliminary light emission. Further, in a case where the acquired setting information indicates the communication rate higher than the threshold value set to the communication with the image capturing apparatus 100, the strobe MPU 501 can transmit the preliminary light emission result information performed by the strobe device 500 only by the normal first communication processing before preliminary light emission.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-086106, filed May 21, 2021, which is hereby incorporated by reference herein in its entirety.

What is claimed is:

1. An image capturing apparatus comprising:
  at least one processor; and
  a memory coupled to the at least one processor, the memory having instructions that, when executed by the processor, perform operations as:
  an image capturing communication section configured to communicate with a lighting device; and
  a light control unit configured to execute a light control process for determining a light amount of main emission by the lighting device, by causing the lighting device to perform preliminary light emission,
  wherein in a case where an image capturing frequency for repeating image capturing is higher than a threshold value, the image capturing communication section communicates information which is different from information on the light amount of main emission and is used for settings of preliminary light emission or main light emission, by dividing the information into information communicated by a first communication processing before preliminary light emission and information communicated by a second communication processing after the preliminary light emission.

2. The image capturing apparatus according to claim 1, wherein the light control unit executes the light control process for determining the light amount of main emission by the lighting device, based on the information on the lighting device, which is acquired by the image capturing communication section, and
  wherein in a case where the image capturing communication section acquires the information which is different from the information on the light amount of main emission and is used for the settings of preliminary light emission or main light emission, by dividing the information into the information acquired by the first communication processing before the preliminary light emission and the information acquired by the second communication processing after the preliminary light emission, the light control unit executes the light control process for determining a light amount of main emission by the lighting device for main image capturing, using the information acquired by the first communication processing before the preliminary light emission, in parallel with the second communication processing after the preliminary light emission by the image capturing communication section.

3. The image capturing apparatus according to claim 2, wherein in a case where the light control unit executes the light control process for determining a light amount of main emission by the lighting device for main image capturing, using the information acquired by the first communication processing before the preliminary light emission, which is performed by the image capturing communication section, in parallel with the second communication processing after the preliminary light emission, which is performed by the image capturing communication section, the light control unit substitutes preceding information acquired by the second communication processing after the preliminary light emission for lacking information.

4. The image capturing apparatus according to claim 1, wherein the image capturing communication section determines whether or not the image capturing frequency for repeating image capturing is higher than the threshold value by determining whether or not a continuous shooting speed exceeds a predetermined value based on continuous shooting settings of the image capturing apparatus.

5. The image capturing apparatus according to claim 4, wherein the image capturing communication section reduces an amount of information communicated by the first communication processing before the preliminary light emission according to how much degree the continuous shooting speed exceeds the predetermined value.

6. The image capturing apparatus according to claim 4, wherein the image capturing communication section acquires at least charge completion information of the lighting device by the first communication processing before the preliminary light emission.

7. The image capturing apparatus according to claim 1, wherein even in a case where image capturing is repeated, the image capturing communication section communicates the information which is different from the information on the light amount of main emission and is used for the settings of the preliminary light emission or the main light emission, only by the first communication processing before the preliminary light emission.

8. A lighting device used for image capturing performed by an image capturing apparatus, comprising:
  at least one processor; and
  a memory coupled to the at least one processor, the memory having instructions that, when executed by the processor, perform operations as:
  a light emission controller configured to control light emission of a light emission section; and
  a communication section configured to communicate with the image capturing apparatus and acquire setting information of the image capturing apparatus before image capturing,
  wherein in a case where the acquired setting information indicates a mode of repeating image capturing at high speed, the communication section communicates information which is different from information on a light amount of main emission and is used for settings of preliminary light emission or main light emission, by dividing the information into information communicated by a first communication processing before the preliminary light emission and information communicated by a second communication processing after the preliminary light emission.

9. The lighting device according to claim 8, wherein in a case where the acquired setting information indicates a mode of giving priority to continuous shooting speed of image capturing, the communication section communicates the information which is different from the information on the light amount of main emission and is used for the settings of preliminary light emission or main light emission, by dividing the information into the information communicated by the first communication processing before the preliminary light emission and the information communicated by the second communication processing after the preliminary light emission.

10. The lighting device according to claim 8, wherein in a case where the acquired setting information indicates a communication rate not higher than a threshold value for communication with the image capturing apparatus, the communication section communicates the information which is different from the information on the light amount of main emission and is used for the settings of preliminary light emission or main light emission, by dividing the information into the information communicated by the first communication processing before the preliminary light emission and the information communicated by the second communication processing after the preliminary light emission.

11. The lighting device according to claim 8, wherein the communication section transmits at least charge completion information of the lighting device only by the first communication processing before the preliminary light emission.

12. The lighting device according to claim 8, wherein even in a case where image capturing is repeated by the image capturing apparatus, the communication section transmits the first information which is different from the information on the light amount of main emission and is used for the settings of preliminary light emission or main light emission, only by the first communication processing before the preliminary light emission.

13. A method of controlling an image capturing apparatus, comprising:
   executing a light control process for determining a light amount of main emission by a lighting device by causing the lighting device to perform preliminary light emission; and
   communicating, in a case where an image capturing frequency for repeating image capturing is higher than a threshold value, information which is different from information on the light amount of main emission and is used for settings of preliminary light emission or main light emission, by dividing the information into information communicated by a first communication processing before the preliminary light emission and information communicated by a second communication processing after the preliminary light emission.

14. A method of controlling a lighting device used for image capturing by an image capturing apparatus, comprising:
   acquiring setting information of the image capturing apparatus before the image capturing; and
   communicating, in a case where the setting information indicates a mode of repeating image capturing at high speed, information which is different from information on a light amount of main emission and is used for settings of preliminary light emission or main light emission, by dividing the information into information communicated by a first communication processing before the preliminary light emission and information communicated by a second communication processing after the preliminary light emission.

* * * * *